(12) United States Patent
Bae (10) Patent No.: US 10,236,485 B2
(45) Date of Patent: Mar. 19, 2019

(54) BATTERY MODULE

(71) Applicant: SAMSUNG SDI CO., LTD., Yongin-si, Gyeonggi-do (KR)

(72) Inventor: Sanghoon Bae, Yongin-si (KR)

(73) Assignee: Samsung SDI Co., Ltd., Yongin-Si, Gyeonggi-do (KR)

( * ) Notice: Subject to any disclaimer, the term of this patent is extended or adjusted under 35 U.S.C. 154(b) by 248 days.

(21) Appl. No.: 15/245,222

(22) Filed: Aug. 24, 2016

(65) Prior Publication Data

US 2017/0062780 A1    Mar. 2, 2017

(30) Foreign Application Priority Data

Aug. 26, 2015 (KR) .................. 10-2015-0120088

(51) Int. Cl.
*H01M 2/10* (2006.01)
*H01M 2/20* (2006.01)
*H01M 2/26* (2006.01)

(52) U.S. Cl.
CPC ....... *H01M 2/1061* (2013.01); *H01M 2/1077* (2013.01); *H01M 2/204* (2013.01); *H01M 2/206* (2013.01)

(58) Field of Classification Search
CPC .. H01M 2/1061; H01M 2/1077; H01M 2/204; H01M 2/206
See application file for complete search history.

(56) References Cited

U.S. PATENT DOCUMENTS

| 5,607,484 A | 3/1997 | Redden et al. | |
|---|---|---|---|
| 2008/0124617 A1* | 5/2008 | Bjork | ............... H01M 2/204 429/90 |
| 2014/0023909 A1* | 1/2014 | Suzuki | ............... H01M 2/206 429/158 |
| 2015/0280190 A1* | 10/2015 | Ohshiba | ............... H01M 2/1094 429/53 |
| 2015/0285839 A1* | 10/2015 | Merriman | ......... H01M 10/4207 429/90 |

FOREIGN PATENT DOCUMENTS

| JP | 09-129212 A | 5/1997 |
|---|---|---|
| JP | 2003-017112 A | 1/2003 |
| JP | 2003-092100 A | 3/2003 |
| JP | 2007-250319 A | 9/2007 |
| JP | 2009-289418 A | 12/2009 |

\* cited by examiner

*Primary Examiner* — Sarah A. Slifka
*Assistant Examiner* — Lilia Nedialkova
(74) *Attorney, Agent, or Firm* — Lee & Morse, P.C.

(57) ABSTRACT

A battery module, including a plurality of battery units each including a plurality of bare cells, each bare cell having a first electrode tab and a second electrode tab; a holder at one side of each of the battery units, the holder including a plurality of penetrating holes into each of which the first electrode tab and the second electrode tab are penetrated; a plurality of electrode plates in the holder, the plurality of electrode plates electrically connecting the bare cells in each of the battery units; connection members coupled to ends of one of the plurality of electrode plates, the connection members electrically connecting the plurality of battery units to each other, and a pair of mounting protrusions protruding from one side of the holder and being spaced apart from each other, a portion of one of the plurality of electrode plates passing between the pair of mounting protrusions.

9 Claims, 12 Drawing Sheets

BATTERY MODULE

CROSS-REFERENCE TO RELATED APPLICATION

Korean Patent Application No. 10-2015-0120088, filed on Aug. 26, 2015, in the Korean Intellectual Property Office, and entitled: "Battery Module," is incorporated by reference herein in its entirety.

BACKGROUND

1. Field

Embodiments relates to a battery module.

2. Description of the Related Art

A secondary battery may repeatedly be charged and discharged, unlike a primary battery which may not be rechargeable. Low capacity secondary batteries that use single bare cells may be used as power sources for various small portable electronic devices such as, for example, cellular phones or camcorders. High power secondary batteries that use, e.g., tens of bare cells connected to each other in a battery pack, may be used as power sources for driving a motor, such as in, for example, hybrid electric vehicles.

Secondary batteries may be manufactured in various shapes, for example, a cylindrical shape, a prismatic shape and a pouch shape. A secondary battery may be constructed by installing an electrode assembly in which a positive electrode and a negative electrode with a separator interposed between the positive and negative electrodes and being accommodated in a case with an electrolyte, and sealing the case. Positive and negative terminals may be connected to the electrode assembly and may protrude and be exposed to the outside of the case.

SUMMARY

Embodiments may be realized by providing a battery module, including a plurality of battery units each including a plurality of bare cells, each bare cell having a first electrode tab and a second electrode tab; a holder at one side of each of the battery units, the holder including a plurality of penetrating holes into each of which the first electrode tab and the second electrode tab are penetrated; a plurality of electrode plates in the holder, the plurality of electrode plates electrically connecting the bare cells in each of the battery units; connection members coupled to ends of one of the plurality of electrode plates, the connection members electrically connecting the plurality of battery units to each other; and a pair of mounting protrusions protruding from one side of the holder, the pair of mounting portions being spaced apart from each other, a portion of one of the plurality of electrode plates passing between the pair of mounting protrusions.

The holder may include a first region corresponding to a region from which the first electrode tab and the second electrode tab are drawn and a second region that is vertically bent, the second region extending from the first region, the penetrating holes may be in the first region, and the pair of mounting protrusions may be in the second region.

The holder may further include a plurality of partition walls separating the plurality of electrode plates such that the electrode plates are spaced apart from each other.

Each of the plurality of electrode plates may include at least one penetrating hole, and one of the first electrode tab and the second electrode tab may penetrate into the at least one penetrating hole of each of the plurality of electrode plates, so that one of the first electrode tab and the second electrode tab is electrically connected to each of the electrode plates.

The plurality of electrode plates may include a first electrode plate and a second electrode plate, and connection plates that may be vertically bent may be connected to the connection members at ends of the first electrode plate and the second electrode plate.

A region of the first electrode plate may pass between the pair of mounting protrusions, and the first electrode plate may extend past the pair of mounting protrusions.

The first electrode plate may extend past the second electrode plate.

Each of the connection members may include a plurality of connection member holes, and the connection plates may pass through the connection member holes, the connection plates being coupled to the connection members.

The connection members may include a first connection member and a second connection member, and one of the connection members may be mounted on the pair of mounting protrusions.

The connection member mounted on the pair of mounting protrusions may be electrically insulated from the electrode plate having a region that passes between the pair of mounting protrusions.

The battery module may further include fixing protrusions protruding from two sides of the mounting protrusions, one of the connection members being mounted on regions of the mounting protrusions between the fixing protrusions.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout. As used herein, the term "and/or" includes any and all combinations of one or more of the associated listed items.

In addition, the terminology used herein is for the purpose of describing particular embodiments only and is not intended to be limiting thereof. As used herein, the singular forms are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various members, elements, regions, layers and/or sections, these members, elements, regions, layers and/or sections should not be limited by these terms. These terms are only used to distinguish one member, element, region, layer, and/or section from another. Thus, for example, a first member, a first element, a first region, a first layer and/or a first section discussed below could be termed a second member, a second element, a second region, a second layer and/or a second section without departing from the teachings.

Figure 1:
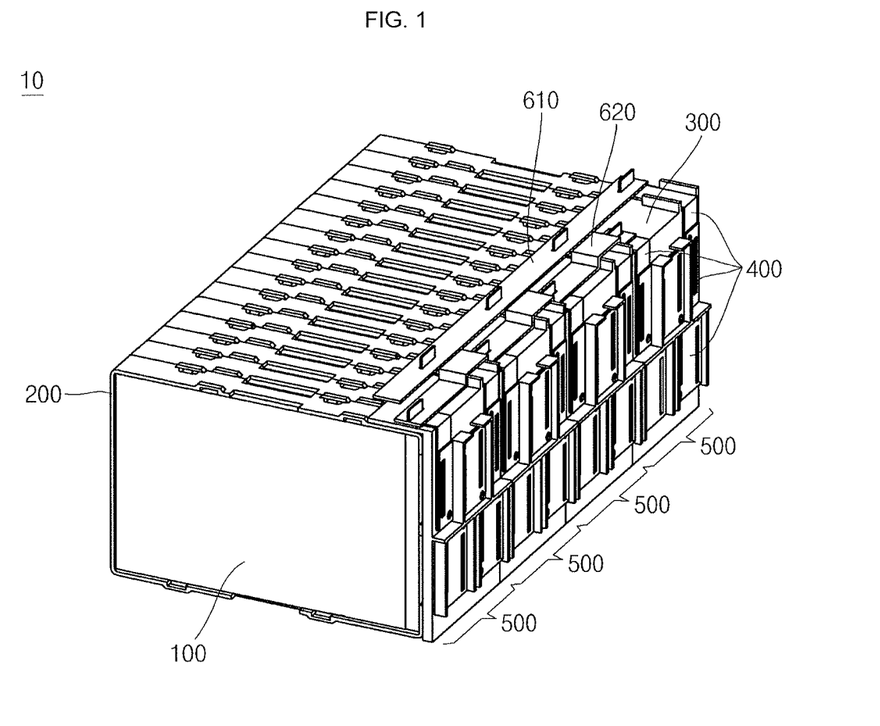
FIG. 1 illustrates a perspective view of a battery module according to an embodiment.
Figure 2:
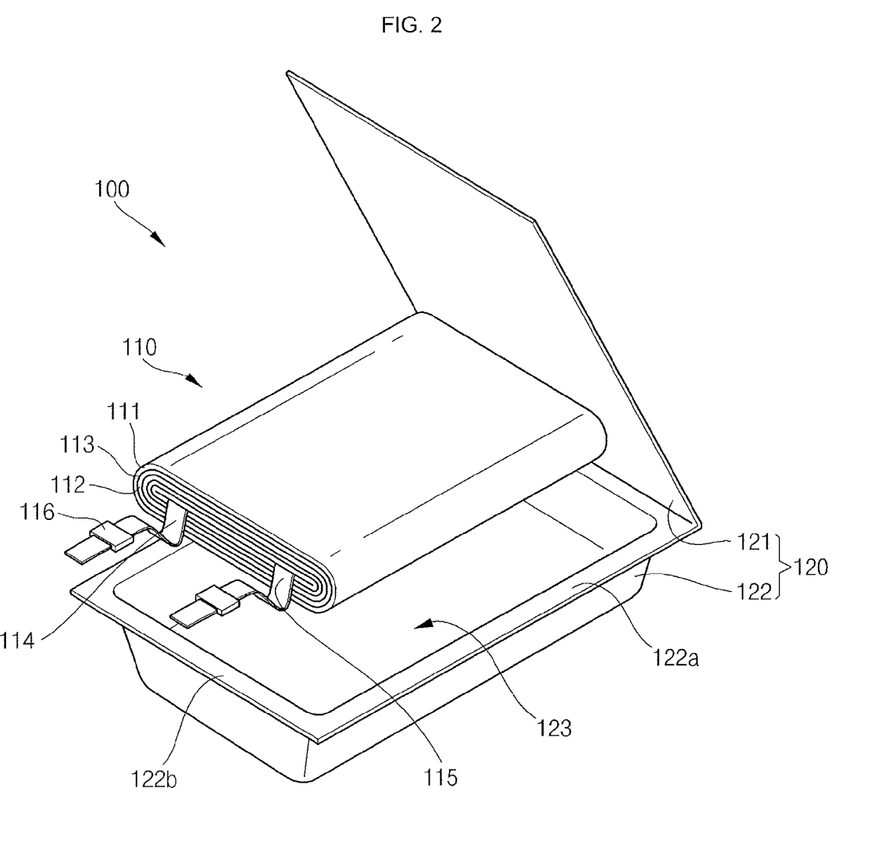
FIG. 2 illustrates an exploded perspective view of a bare cell in the battery module illustrated in FIG. 1.
Figure 3:
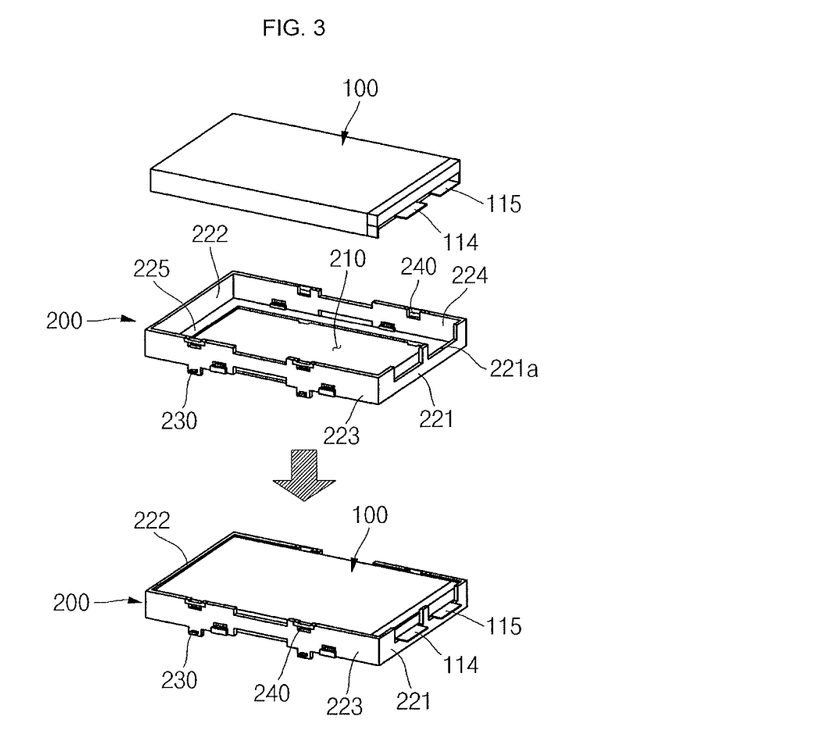
FIG. 3 illustrates a perspective view of coupling structures of bare cells and battery frames in the battery module illustrated in FIG. 1.
Figure 4:
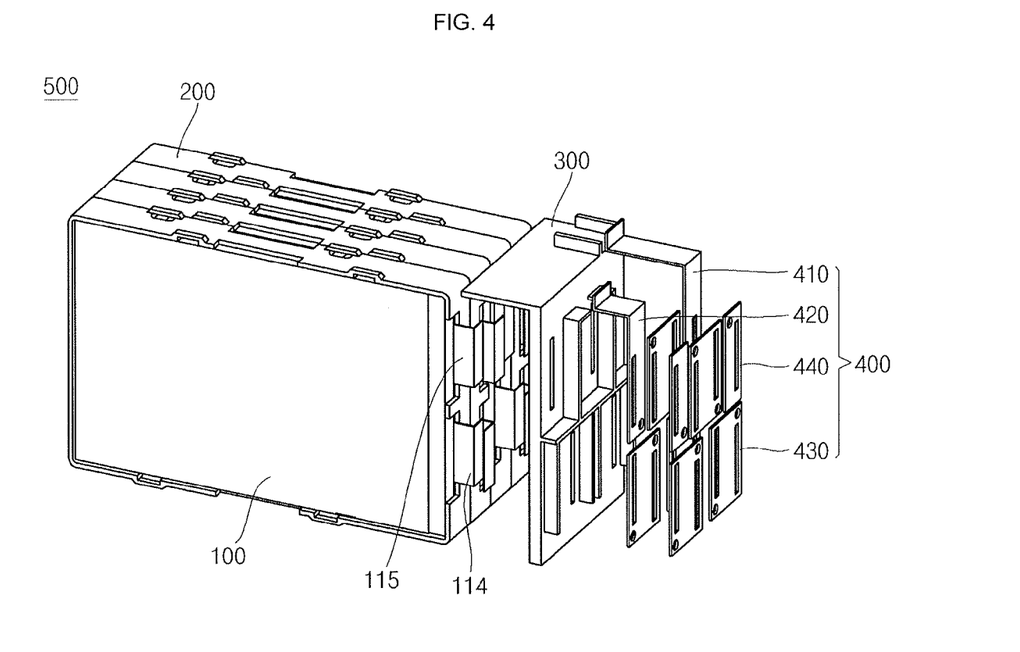
FIG. 4 illustrates an exploded perspective view of a battery unit in the battery module illustrated in FIG. 1.
Figure 5:
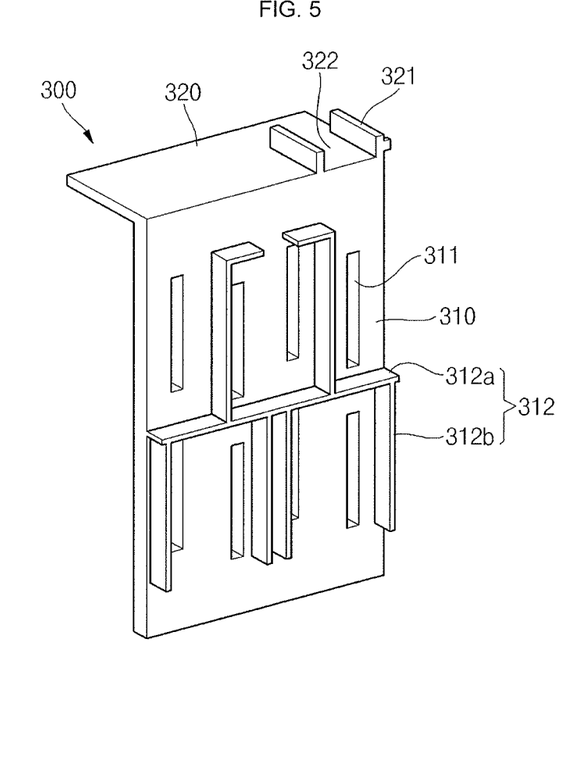
FIG. 5 illustrates a perspective view of a holder in the battery module illustrated in FIG. 1.
Figure 6A:
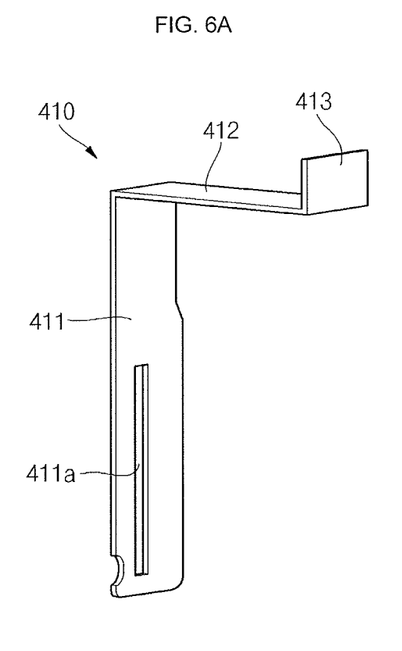
FIGS. 6A to 6D illustrate perspective views of a plurality of electrode plates in the battery module illustrated in FIG. 1.
Figure 6B:
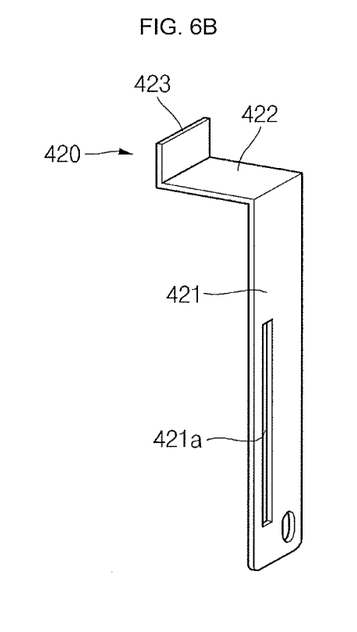
Figure 6C:
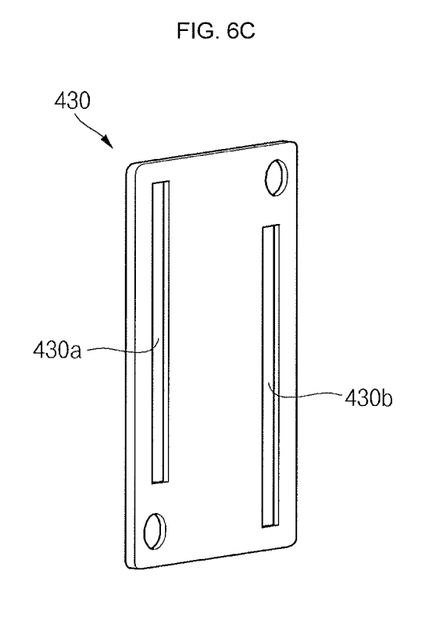
Figure 6D:
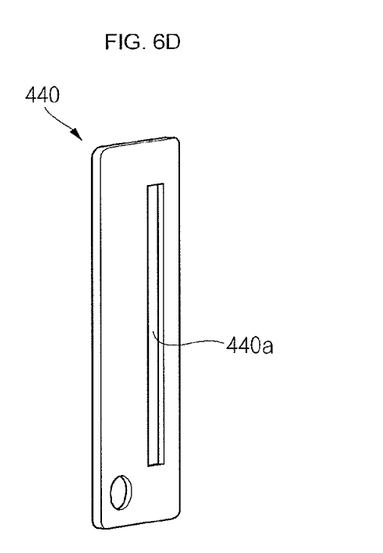
Figure 7:
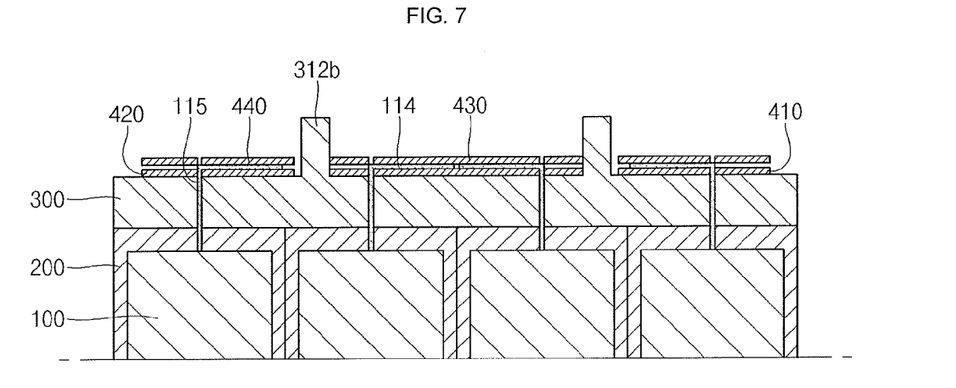
FIG. 7 illustrates a cross-sectional view of coupling structures between each of an electrode tab, a holder and an electrode plate in the battery module illustrated in FIG. 1.
Figure 8:
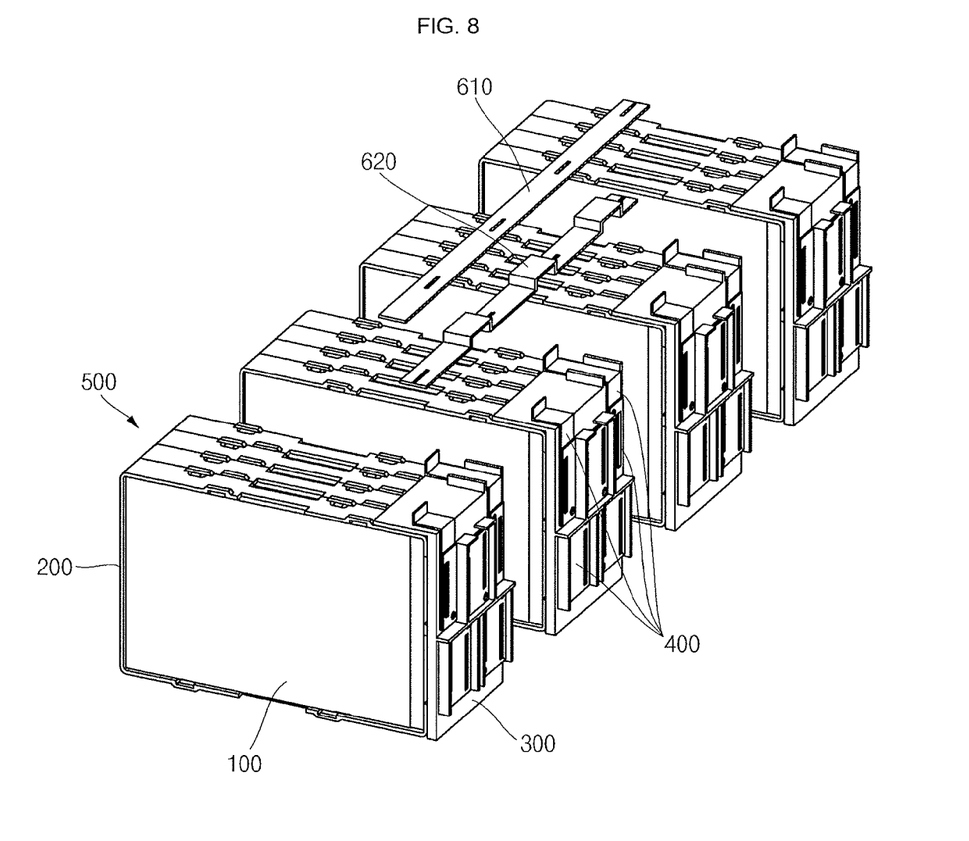
FIG. 8 illustrates an exploded perspective view of the battery module illustrated in FIG. 1.
Figure 9A:
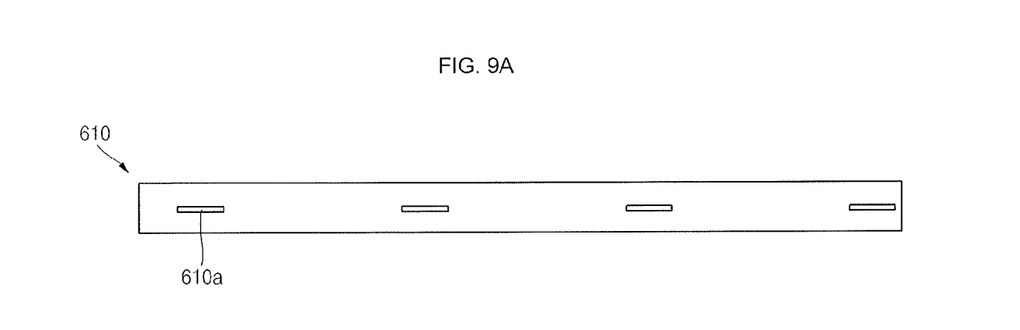
FIGS. 9A and 9B illustrate views of a connection member in the battery module illustrated in FIG. 1.
Figure 9B:
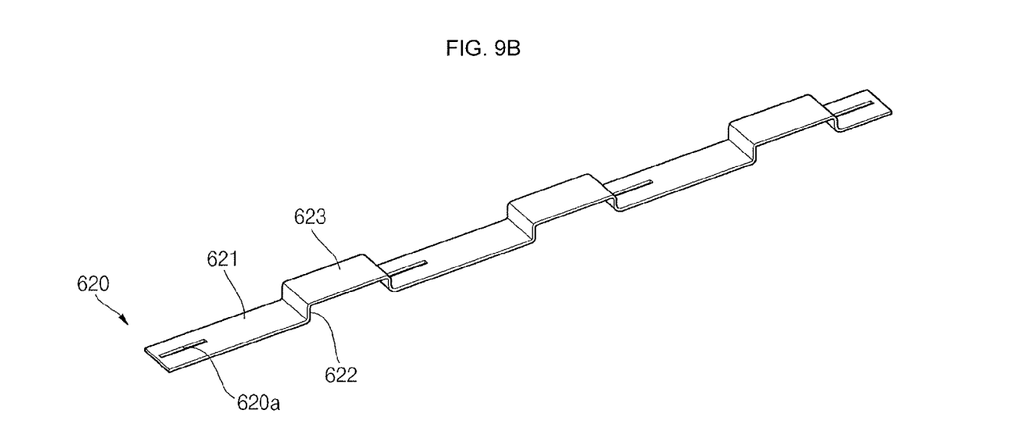

FIG. 1 illustrates a perspective view of a battery module according to an embodiment, FIG. 2 illustrates an exploded perspective view of a bare cell in the battery module illustrated in FIG. 1, FIG. 3 illustrates a perspective view of a coupling structure of a bare cell and a battery frame in the battery module illustrated in FIG. 1, FIG. 4 illustrates an exploded perspective view of a battery unit in the battery module illustrated in FIG. 1, FIG. 5 illustrates a perspective view of a holder in the battery module illustrated in FIG. 1, FIGS. 6A to 6D illustrate perspective views of a plurality of electrode plates in the battery module illustrated in FIG. 1, FIG. 7 illustrates a cross-sectional view of coupling structures between each of an electrode tab, a holder and an electrode plate in the battery module illustrated in FIG. 1, FIG. 8 illustrates an exploded perspective view of the battery module illustrated in FIG. 1, and FIGS. 9A and 9B illustrate views of a connection member in the battery module illustrated in FIG. 1.

Referring to FIGS. 1 to 9B, the battery module 10 according to an embodiment may include a plurality of battery units 500 and connection members 610 and 620 electrically connecting the plurality of battery units 500 to each other. Each of the battery units 500 may include a plurality of bare cells 100, a battery frame 200 accommodating the bare cells 100, a holder 300 coupled to one side of the battery units 500, and electrode plates 410, 420, 430 and 440 mounted in the holder 300 and electrically connecting the plurality of bare cells 100. A battery module 10 including, for example, four battery units 500 each including four bare cells 100 is disclosed and provided only for illustration.

Each of the bare cells 100 may include an electrode assembly 110 and a case 120 accommodating the electrode assembly 110. A pouch type battery, for example, as the bare cell 100 is illustrated. In some embodiments, a prismatic battery may also be used as the bare cell 100.

The electrode assembly 110 may be formed by laminating or winding a stacked structure having a first electrode plate 111, a second electrode plate 112 and a separator 113 interposed between the first and second electrode plates 111 and 112. The first electrode plate 111 may function as a positive electrode and the second electrode plate 112 may function as a negative electrode, or vice versa.

When the first electrode plate 111 is a positive electrode, it may be formed by coating a first active material layer on opposite surfaces of a first current collector made of a highly conductive metal foil, e.g., an aluminum (Al) foil. The first active material may include chalcogenide compounds, and examples thereof may include composite metal oxides such as $LiCoO_2$, $LiMn_2O_4$, $LiNiO_2$, or $LiNiMnO_2$.

A first electrode tab 114 may be formed on a first non-coating portion where a first active material layer of the first electrode plate 111 is not formed. One end of the first electrode tab 114 may be electrically connected to the first non-coating portion and the other end of the first electrode tab 114 may be drawn to the outside of the case 120. An insulating tape 116 may be attached to a region contacting the case 120 of the first electrode tab 114. The insulating tape 116 may be made of, for example, polyphenylene sulfide (PPS), polyimide (PI) or polypropylene (PP).

When the second electrode plate 112 is a negative electrode, it may be formed by coating a second active material layer on opposite surfaces of a second current collector made of a conductive metal foil, e.g., a copper (Cu) or nickel (Ni) foil, and examples thereof may include a carbonaceous material, Si, Sn, tin oxide, a tin oxide composite, a transition metal oxide, lithium metal nitride or lithium metal oxide.

A second electrode tab 115 may be formed on a second non-coating portion where a second active material layer of the second electrode plate 112 is not formed. One end of the second electrode tab 115 may be electrically connected to the second non-coating portion and the other end of the second electrode tab 115 may be drawn to the outside of the case 120. The insulating tape 116 may be attached to a region contacting the case 120 of the second electrode tab 115.

The separator 113 may be positioned between the first electrode plate 111 and the second electrode plate 112 to help prevent a short circuit from occurring between the first electrode plate 111 and the second electrode plate 112. The separator 113 may be made of, for example, polyethylene, polypropylene or a copolymer of polyethylene and polypropylene. In order to help prevent a short circuit between the first and second electrode plates 111 and 112, the separator 113 may have a larger width than the first and second electrode plates 111 and 112.

The case 120 may include an upper case 121 and a lower case 122, which may be formed by bending the center of one side of an integrally formed rectangular pouch layer in a lengthwise direction of the one side. A groove 123, in which the electrode assembly 110 may be accommodated, may be formed in the lower case 122 by pressing. A side sealing portion 122*a* and a top sealing portion 122*b* to be sealed with the upper case 121 along three sides of the groove 123 may be formed in the lower case 122, except for the side of the pouch layer integrally contacting the upper case 121.

After the electrode assembly 110 is accommodated in the groove 123 of the lower case 122, the side sealing portion 122*a* and the top sealing portion 122*b* may be thermally fused to seal the case 120 in a state in which the lower case 122 and the upper case 121 are brought into contact with each other. The side sealing portion 122*a*, except for the top sealing portion 122*b* from which the first and second electrode tabs 114 and 115 of each of the bare cells 100 may protrude, may be folded toward side surfaces of the lower case 122.

Each of the bare cells 100 may include a top surface from which the first and second electrode tabs 114 and 115 may be drawn, a bottom surface facing the top surface, and a pair of long side surfaces and a pair of short side surfaces connecting the top surface and the bottom surface, the pair of long side surfaces having relatively large areas and the pair of short side surfaces having relatively small areas.

The battery frame 200 may include an accommodating portion 210 to accommodate the bare cells 100. The battery frame 200 may be formed to surround the top surface, the bottom surface and the pair of short side surfaces of the bare cell 100. The battery frame 200 may correspond to the top surface of the bare cell 100 and may include an electrode tab hole 221*a*. The battery frame 200 may include a first sidewall 221 from which the first and second electrode tabs 114 and 115 may be drawn, a second sidewall 222 corresponding to the bottom surface of the bare cell 100 and third and fourth sidewalls 223 and 224 corresponding to the pair of short side surfaces of the bare cell 100.

The battery frame 200 may have one side and the other side, e.g., another side, which may be opened to expose the pair of long side surfaces of the bare cell 100. The pair of long side surfaces of the bare cell 100 may be exposed by the battery frame 200. A fixing portion 225 may be formed at one side of the battery frame 200, and a portion of one of the pair of long side surfaces may be covered. The bare cell 100 may be prevented from being deviated from the battery frame 200 by the fixing portion 225.

A plurality of fastening protrusions 230 and a plurality of fastening grooves 240 may be provided on the third and fourth sidewalls 223 and 224 of the battery frame 200. The battery frame 200 and its adjacent battery frame 200 may be combined with each other by the fastening protrusions 230 and the fastening grooves 240. The fastening protrusions 230 may include hook-type protrusion parts formed at ends thereof, and loop portions on which the protrusion parts are locked may be formed at entrance parts of the fastening grooves 240. Therefore, the protrusion parts of the fastening protrusions 230 may be inserted into the fastening grooves 240 and locked on the loop portions, and the battery frame 200 and its adjacent battery frame 200 may be combined with each other.

In some embodiments, the battery frames 200 may be arranged such that all of first sides of neighboring battery frames face the same direction. In embodiments, the battery frames 200 may be arranged such that the first sides of neighboring battery frames alternately face the same direction, for example, first sides of two neighboring battery frames may be disposed to face opposite direction. In some embodiments, a separate member, such as an adhesive tape, may also be employed when the battery frames 200 are arranged.

The bare cells 100 of the battery units 500 may be connected to each other in series or in parallel. The present embodiment is described with regard to the bare cells 100 connected to each other in series.

When the bare cells 100 are connected to each other in series, they may be arranged such that the first and second electrode tabs 114 and 115 of the bare cells 100 are alternately positioned. In the arrangement of the battery units 500, the first and second electrode tabs 114 and 115, positioned at one side and the other side, e.g., another side, of the bare cell 100, may be alternately positioned, and referring to FIG. 4, the first electrode tab 114 (bottom) of the first bare cell and the second electrode tab 115 (bottom) of the second bare cell adjacent to the first bare cell may be electrically connected to each other, the first electrode tab 114 (top) of the second bare cell may be connected to the second electrode tab 115 (top) of the third bare cell adjacent to the second bare cell, and the first electrode tab 114 (bottom) of the third bare cell may be electrically connected to the second electrode tab 115 (bottom) of the fourth bare cell adjacent to the third bare cell. The second electrode tab 115 (top) of the first bare cell and the first electrode tab 114 (top) of the fourth bare cell may establish a path for electrical connection with another battery unit.

The first bare cell refers to a bare cell positioned frontmost in FIG. 4, and the fourth bare cell refers to a bare cell positioned rearmost in FIG. 4. The second electrode tab, the first electrode tab, the second electrode tab, and the first electrode tab, positioned on the top portions of the bare cells shown in FIG. 4, may be sequentially arranged in that order, and the first electrode tab, the second electrode tab, the first electrode tab, and the second electrode tab, positioned on the bottom portions of the bare cells shown in FIG. 4, may be sequentially arranged in that order.

The holder 300 may be coupled to one side of each of the battery unit 500 and may function to fix the electrode tabs 114 and 115 of the bare cells 100. The holder 300 may be provided to correspond to one of the battery units 500. The holder 300 may be coupled to a position of the battery frame 200, corresponding to the first sidewall 221 from which the first and second electrode tabs 114 and 115 may be drawn. The holder 300 may include a first region 310 corresponding to the first sidewall 221 and a second region 320 bent from the first region 310 and extending to the fourth sidewall 224 of the battery frame 200. A plurality of first and second electrode tabs 114 and 115, a plurality of electrode plates 400, and connection members 610 and 620 may come into direct contact with the holder 300, and the holder 300 may be made of an insulating material.

The first region 310 may cover the first sidewall 221 of the battery frame 200. The first region 310 may be provided to cover all of a plurality of first sidewalls 221 constituting the battery units 500. The first region 310 may include a plurality of penetrating holes 311 through which the first and second electrode tabs 114 and 115 of each of the plurality of bare cells 100 constituting the battery units 500 may be drawn. The penetrating holes 311 may be formed at positions corresponding to the first and second electrode tabs 114 and 115. One of the battery units 500 may include four bare cells 100, each of the four bare cells 100 may include a first electrode tab 114 and a second electrode tab 115, and a total of 8 penetrating holes 311 may be formed in the first region 310. The plurality of penetrating holes 311 may include four penetrating holes through which the first electrode tabs 114 may pass and four penetrating holes through which the second electrode tabs 115 may pass.

In order to more tightly fix the first and second electrode tabs 114 and 115 having passed through the penetrating holes 311 to the holder 300, a separate fixing operation may be performed. The fixing operation may be performed by any method so long as the method enables an fixing operation of the first and second electrode tabs 114 and 115 to the holder 300.

Partition walls 312 for separating the plurality of electrode plates 400 from each other may be formed in the first region 310. The partition walls 312 may outwardly protrude from the first region 310 to electrically separating the respective electrode plates 400 from each other. The partition walls 312 may include a first partition wall 312a separating the first and second electrode tabs 114 and 115 of each of the bare cells 100 from each other, and a plurality of second partition walls 312b disposed to be perpendicular to the first partition wall 312a and separating the plurality of bare cells 100 from each other. The plurality of electrode plates 400 may be electrically insulated from other regions by the partition walls 312 and may be electrically connected to the electrode tabs 114 and 115 corresponding thereto.

The second region 320 may be substantially vertically bent and extended from the first region 310. The second region 320 may cover a portion of the fourth sidewall 224 of the battery frame 200. Of source, the second region 320 may be provided to cover all of fourth sidewalls 224 constituting the battery units 500.

A pair of mounting protrusions 321 spaced a predetermined distance apart from each other may be formed at one side of the second region 320. The mounting protrusions 321 may protrude from the second region 320. The mounting protrusions 321 may be formed to extend from a boundary portion of the first and second regions 310 and 320 to an end of the second region 320. A mounting portion 322 in which the first electrode plate 410 to be described later may be mounted may be formed between the pair of mounting protrusions 321. A second connection member 620 to be described later may be mounted on the pair of mounting protrusions 321. The first electrode plate 410 and the second connection member 620 may be electrically insulated from each other by the mounting protrusions 321.

Each of the electrode plates 400 may electrically connect the bare cells 100 in each of the battery units 500 to each other. The electrode plate 400 may electrically connect the first and second electrode tabs 114 and 115 of the plurality of bare cells 100 drawn through the holder 300. The electrode plate 400 may include a first electrode plate 410, a second electrode plate 420, a third electrode plate 430, and a fourth electrode plate 440.

The first electrode plate 410 may be electrically connected to the first electrode tab 114 of the fourth bare cell of each of the battery units 500. The first electrode plate 410 may include a first plate 411 mounted on the first region 310 of the holder 300, a second plate 412 vertically bent from the first plate 411 and mounted on the second region 320 of the holder 300, and a connection plate 413 vertically bent from the second plate 412 and outwardly extending a predetermined length.

A penetrating hole 411a may be formed in the first plate 411, the first electrode tab 114 drawn through the penetrating hole 311 of the holder 300 may pass through the penetrating hole 411a, and the first plate 411 and the first electrode tab 114 may be electrically connected to each other. The first electrode tab 114 may pass through the penetrating hole 411a to then be bent to closely contact the first plate 411. After the first electrode tab 114 passes through the penetrating hole 411a, a separate fixing operation for more tightly fixing the first electrode tab 114 to the first plate 411 may be performed. The fixing operation may be performed by any method so long as the method enables an fixing operation of the first electrode tab 114 to the first plate 411.

The second plate 412 may be mounted on the mounting portion 322. The second plate 412 may be partially surrounded by the mounting protrusions 321, and it may be electrically insulated from other components. The second plate 412 may be formed to extend longer than, e.g., past or beyond, the mounting protrusions 321 to an end of the second region 320.

The connection plate 413 may serve as an external terminal of the battery unit 500. A first connection member 610 may later be connected to the connection plate 413, and the plurality of battery units 500 may be electrically connected.

The second electrode plate 420 may be electrically connected to the second electrode tab 115 of the first bare cell 100 of the battery unit 500. The second electrode plate 420 may include a first plate 421 mounted on the first region 310 of the holder 300, a second plate 422 vertically bent from the first plate 421 and mounted on the second region 320 of the holder 300, and a connection plate 423 vertically bent from the second plate 422 and outwardly extending a predetermined height.

A penetrating hole 421a may be provided in the first plate 421, the second electrode tab 115 drawn through the penetrating hole 311 of the holder 300 may pass through the penetrating hole 421a, and the second plate 422 and the second electrode tab 115 may be electrically connected to each other. The second electrode tab 115 may pass through the penetrating hole 421a to then be bent to closely contact the first plate 421. After the second electrode tab 115 passes through the penetrating hole 421a, a separate fixing operation for more tightly fixing the second electrode tab 115 to the first plate 421 may be performed. The fixing operation may be performed by any method so long as the method enables an fixing operation of the second electrode tab 115 to the first plate 421.

The second plate 422 may be mounted on the mounting portion 322. The second plate 422 may be formed to be shorter than the second plate 412 of the first electrode plate 410. A length of the second plate 422 may be shorter than lengths of the mounting protrusions 321. An end of the second plate 422 may be closer to a boundary line between the first and second regions 310 and 320 of the holder 300 than an end of the second plate 412 of the first electrode plate 410 and ends of the mounting protrusions 321.

The connection plate 423 may serve as an external terminal of the battery unit 500. A second connection member 620 may later be connected to the connection plate the connection plate 423, and the plurality of battery units 500 may be electrically connected.

The third electrode plate 430 may electrically connect the first and second electrode tabs 114 and 115 of different bare cells 100 of the battery units 500. Referring to FIG. 4, the third electrode plate 430 may electrically connect the first electrode tab 114 (bottom) of the first bare cell to the second electrode tab (bottom) of the second bare cell adjacent to the first bare cell, the first electrode tab 114 (top) of the second bare cell to the second electrode tab (top) of the third bare cell adjacent to the second bare cell, the first electrode tab 114 (bottom) of the third bare cell to the second electrode tab 115 (bottom) of the fourth bare cell adjacent to the third bare cell. The third electrode plate 430 may include first and second penetrating holes 430a and 430b through which the first and second electrode tabs 114 and 115 may pass. The first and second electrode tabs 114 and 115 having passed through the first and second penetrating holes 430*a* and 430*b* may be bent to closely contact the third electrode plate 430.

After the first and second electrode tabs 114 and 115 pass through the penetrating holes 430*a* and 430*b*, a separate fixing operation for more tightly fixing the first and second electrode tabs 114 and 115 to the third electrode plate 430 may be performed. The fixing operation may be performed by any method so long as the method enables an fixing operation of the first and second electrode tabs 114 and 115 to the third electrode plate 430.

The third electrode plate 430 may be coupled to the first and second electrode tabs 114 and 115, as illustrated in FIG. 6C. In some embodiments, the third electrode plate 430 may be reversely coupled to the first and second electrode tabs 114 and 115.

The fourth electrode plate 440 may be adhered to the first and second electrode plates 410 and 420. The first and second electrode tabs 114 and 115 may be interposed between the first electrode plate 410 and the fourth electrode plate 440 or the second electrode plate 420 and the fourth electrode plate 440. Referring to FIG. 7, the fourth electrode plate 440 may fix the first and second electrode plates 410 and 420 and the first and second electrode tabs 114 and 115 to the holder 300. The first and second electrode tabs 114 and 115 may be positioned between each of the first and second electrode plates 410 and 420 and the fourth electrode plate 440, respectively, to then be fixed by laser welding. A penetrating hole 440*a* may be provided in the fourth electrode plate 440 so as to correspond to the first electrode plate 410 or the second electrode plate 420. Welding between each of the first and second electrode plates 410 and 420, the first and second electrode tabs 114 and 115, and the fourth electrode plate 440 may be efficiently performed by the penetrating hole 440*a*.

The fourth electrode plate 440 may be coupled to top portions of the first and second electrode plates 410 and 420, as illustrated in FIG. 6D. In some embodiments, the fourth electrode plate 440 may be reversely coupled to the first and second electrode plates 410 and 420.

Similar to the coupling structures between each of the first and second electrode plates 410 and 420 and the fourth electrode plate 440, the third electrode plate 430 may also be welded to another third electrode plate 430 by laser welding with the first and second electrode tabs 114 and 115 interposed between the neighboring third electrode plates 430.

The first electrode tab 114 and the second electrode tab 115 may be laser-welded to the holder 300 while being interposed between the two electrode plates and may be fixed to the holder 300, and the first and second electrode tabs 114 and 115 and the electrode plate 400 may be more tightly coupled. The first and second electrode tabs 114 and 115 and the electrode plate 400 may be tightly fixed to the holder 300.

The plurality of electrode plates 400 may be spaced apart from each other by the first and second partition walls 312*a* and 312*b* in the first region 310 of the holder 300. A region from which the second electrode tab 115 of the first bare cell 100 may be drawn may be separated from other regions by two sidewalls formed by the first and second partition walls 312*a* and 312*b*. The second electrode plate 420 may be positioned in the region from which the second electrode tab 115 of the first bare cell 100 may be drawn. A region from which the first electrode tab of the fourth bare cell may be drawn may be separated from other regions by two sidewalls formed by the first and second partition walls 312*a* and 312*b*. The first electrode plate 410 may be positioned in the region from which the first electrode tab of the fourth bare cell may be drawn.

Regions from which the first electrode tab 114 of the first bare cell 100 and the second electrode tab 115 of the second bare cell may be drawn, regions from which the first electrode tab 114 of the second bare cell and the second electrode tab 115 of the third bare cell may be drawn, and regions from which the first electrode tab 114 of the third bare cell and the second electrode tab 115 of the fourth bare cell may be drawn, may be separated from other regions by three sidewalls formed by the first and second partition walls 312*a* and 312*b*. The third electrode plate 430 may be positioned on each of the regions.

As described above, the regions where the electrode plates 400 may be positioned may be separated from each other by the partition walls 312, and the respective electrode plates 400 may be easily electrically insulated from each other. The electrode plate 400 may be simply coupled and fixed to appropriate positions by means of the partition walls 312.

The battery units 500 may be configured such that they may be electrically connected to each other by the electrode plates 400 in a state in which the plurality of bare cells 100 are accommodated in the battery frame 200. Each of the battery units 500 may include the holder 300 provided at its one side to couple and fix the first and second electrode tabs 114 and 115 of each bare cell 100 to the electrode plate 400. The holder 300 and the electrode plate 400 may compatibly be used for each of the battery units 500. The compatible holder 300 and the compatible electrode plate 400 may allow the battery pack 10 to be extensible in view of capacity and size by connecting the plurality of battery units 500 having the same configuration.

The battery pack 10 may be extended in view of capacity and size by additionally installing the battery units 500 including the holders 300 having the same configuration and the electrode plates 400 having the same configuration without using a separate member, and materials costs may be saved and manufacturability may be improved.

The connection members 610 and 620 may electrically connect the plurality of battery units 500 to each other. The connection members 610 and 620 may include a first connection member 610 electrically connecting a plurality of first electrode plates 410 and a second connection member 620 electrically connecting a plurality of second electrode plates 420.

In the illustrated embodiment, the connection members 610 and 620 may be configured to have lengths so as to be fitted to four battery units 500. In an embodiment, the lengths of the connection members 610 and 620 may be decreased or increased according to the number of battery units 500 constituting the battery module 10.

The first connection member 610 may be in a shape of a planar plate and may electrically connect the first electrode plates 410. For example, the first connection member 610 may include a plurality of penetrating holes 610*a* spaced a predetermined distance apart from each other. The connection plate 413 of the first electrode plate 410 may be inserted and penetrated into each of the penetrating holes 610*a*, and the first electrode plates 410 of the plurality of battery units 500 may be electrically connected to each other by the first connection member 610. After the connection plate 413 is penetrated into the penetrating hole 610*a*, it may be coupled and fixed to the first connection member 610 by, for example, soldering.

The second plate 412 of the first electrode plate 410 may be formed to extend longer than, e.g., past or beyond, the mounting protrusions 321. The connection plate 413 and the mounting protrusions 321 may be positioned to be spaced apart from each other. A distance between the connection plate 413 and each of the mounting protrusions 321 may be large enough to allow the first connection member 610 and the mounting protrusions 321 to be spaced sufficiently apart from each other, and the first connection member 610 may be easily coupled to the first electrode plate 410 without being interfered by the mounting protrusions 321. The first connection member 610 may also be spaced apart from a second connection member 620 mounted on the mounting protrusions 321, which will later be described, and electrical insulation between the first connection member 610 and the second connection member 620 may be achieved.

The second connection member 620 may electrically connect a plurality of second electrode plates 420. For example, a plurality of penetrating holes 620a spaced a predetermined distance apart from each other may be provided in the second connection member 620. Connection plates 423 of the second electrode plates 420 may be inserted and penetrated into the penetrating holes 620a, and the second electrode plates 420 of the plurality of battery units 500 may be electrically connected by the second connection member 620. After the connection plate 423 is penetrated into the penetrating holes 620a, it may be coupled and fixed to the second connection member 620 by, for example, soldering.

The second connection member 620 may be formed such that a portion of a planar plate is bent. The second connection member 620 may have a first region 621, a second region 622 that may be substantially vertically bent from the first region 621, and a third region 623 that may be substantially vertically bent from the second region 622. The second region 622 and the third region 623 may be formed at positions corresponding to the pair of mounting protrusions 321. The second connection member 620 may be bent from the regions corresponding to the mounting protrusions 321 to allow the third region 623 to be placed on the pair of mounting protrusions 321, and the first electrode plate 410 passing a mounting portion 322 between the pair of mounting protrusions 321 may be electrically insulated from the second connection member 620.

The second region 422 of the second electrode plate 420 may be shorter than the mounting protrusions 321. The connection plate 423 of the second electrode plate 420 may be positioned so as not to get, e.g., extend, beyond an extension line of ends of the pair of mounting protrusions 321. On the basis of the extension line of the ends of the pair of mounting protrusions 321, the first electrode plate 410 may be formed beyond the extension line while the second electrode plate 420 may be formed so as not to get, e.g., extend, beyond the extension line, and the first and second connection members 610 and 620 respectively coupled to the connection plate 413 of the first electrode plate 410 and the connection plate 413 of the second electrode plate 420 may be positioned to be spaced apart from each other. The first and second connection members 610 and 620 may be connected to the first and second electrode plates 410 and 420, respectively, in a state in which they are electrically insulated.

As described above, the battery module 10 may include the plurality of battery units 500 each including the holder 300 and the electrode plate 400, which may compatibly be used for each of battery units 500 constituting the battery module 10. Each of the battery units 500 may use the compatible holder 300 and the compatible electrode plate 400, and the capacity of the battery module 10 may be easily extended by freely varying the number of battery units 500. The battery units 500 constituting the battery module 10 may be electrically connected to each other by the connection members 610 and 620. The connection members 610 and 620 may be used just by varying their lengths according to the number of battery units 500, and they may be easily employed to, e.g., in, the battery module 10 having various capacities.

The battery module 10 may employ the holders 300, the electrode plates 400, and the connection members 610 and 620, which may be compatible for each of battery units 500 constituting the battery module 10, instead of employing different components according to the capacity desired, and the battery module 10 may easily extend the capacity and demonstrates effects of cost reduction and manufacturability improvement.

Figure 10:
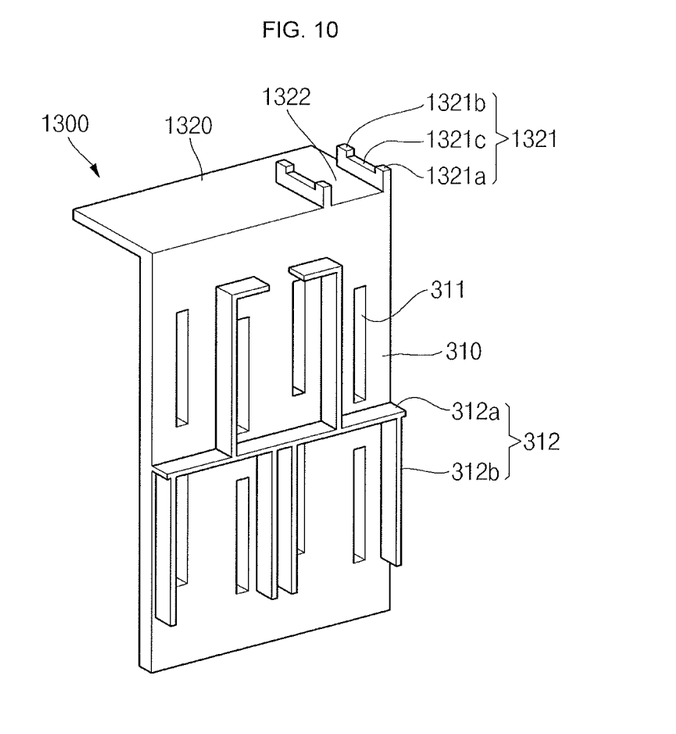
FIG. 10 illustrates a perspective view of a holder in a battery module according to an embodiment.
Figure 11:
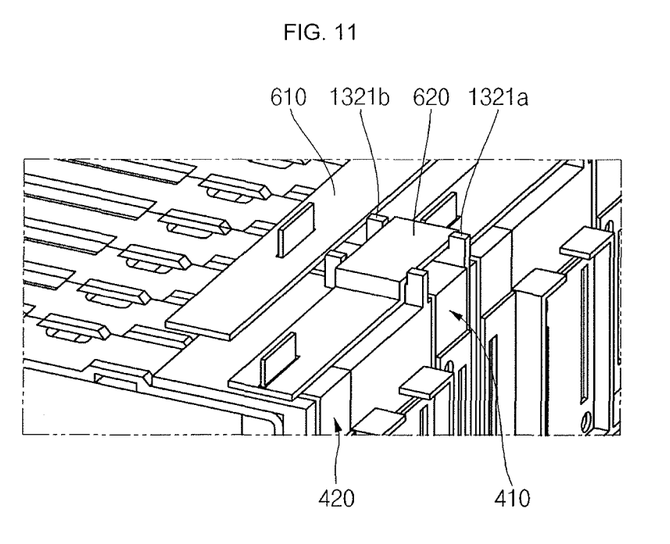
FIG. 11 illustrates an exploded perspective view of a coupling structure of a holder and a connection member in the battery module illustrated in FIG. 10.

FIG. 10 illustrates a perspective view of a holder in a battery module according to an embodiment, and FIG. 11 illustrates an exploded perspective view of a coupling structure of a holder and a connection member in the battery module illustrated in FIG. 10. The same element having the configuration and operation as those of the previous embodiment are denoted by the same reference numeral, and the following description will focus on differences between the present and previous embodiments. For example, the battery module according to an embodiment may be substantially the same as the battery module according to the previous embodiment, and the following description will focus on a configuration of a holder (1300).

Referring to FIGS. 10 and 11, the holder 1300 of the battery module according to an embodiment may have a first region 310 and a second region 1320.

The first region 310 may include a plurality of penetrating holes 311 and partition walls 312a and 312b.

The second region 1320 may be substantially vertically bent from the first region 310. The second region 1320 may cover a portion of a fourth sidewall (224 of the battery frame 200 in FIG. 3). A pair of mounting protrusions 1321 spaced a predetermined distance apart from each other may be formed at one side of the second region 1320. The mounting protrusions 1321 may protrude from the second region 1320. A mounting portion 1322 on which a first electrode plate 410 may be mounted may be formed between the pair of mounting protrusions 1321.

A first fixing protrusion 1321a and a second fixing protrusion 1321b, which may upwardly protrude more than a central portion, may further be formed at one side and the other side, e.g., at two or opposite sides, of each of the mounting protrusions 1321. A recessed region between the first and second fixing protrusions 1321a and 1321b may be a mounting surface 1321c on which the second connection member 620 may be mounted.

The holder 1300 of the battery module according to an embodiment may include the fixing protrusions 1321a and 1321b formed at one side and the other side, e.g., another side, of each of the mounting protrusions 1321, the second connection member 620 may be mounted between the fixing protrusions 1321a and 1321b, and coupling and fixing of the second connection member 620 may be more easily achieved.

By way of summation and review, embodiments may provide a battery module including compatible holders and compatible electrode plates, which may compatibly be used for each of a plurality of battery units constituting the battery module, and the capacity of the battery module may be easily increased, material costs may be reduced, and manufacturability may be improved.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery module, comprising:
    a plurality of battery units each including a plurality of bare cells, each bare cell having a first electrode tab and a second electrode tab;
    a holder at one side of each of the battery units, the holder including a plurality of penetrating holes into each of which the first electrode tab and the second electrode tab are penetrated;
    a plurality of electrode plates in the holder, the plurality of electrode plates including a first electrode plate and a second electrode plate, the plurality of electrode plates electrically connecting the bare cells in each of the battery units;
    connection members coupled to ends of one of the plurality of electrode plates, the connection members electrically connecting the plurality of battery units to each other;
    connection plates that are vertically bent are connected to the connection members at ends of the first electrode plate and the second electrode plate, wherein each of the connection members includes a plurality of connection member holes, and the connection plates pass through the connection member holes, the connection plates being coupled to the connection members and
    a pair of mounting protrusions protruding from one side of the holder, the pair of mounting protrusions being spaced apart from each other,
    a portion of one of the plurality of electrode plates passing between the pair of mounting protrusions.

2. The battery module as claimed in claim 1, wherein:
    the holder includes a first region corresponding to a region from which the first electrode tab and the second electrode tab are drawn and a second region that is vertically bent, the second region extending from the first region,
    the penetrating holes are in the first region, and
    the pair of mounting protrusions are in the second region.

3. The battery module as claimed in claim 1, wherein the holder further includes a plurality of partition walls separating the plurality of electrode plates such that the electrode plates are spaced apart from each other.

4. The battery module as claimed in claim 1, wherein:
    each of the plurality of electrode plates includes at least one penetrating hole, and
    one of the first electrode tab and the second electrode tab penetrates into the at least one penetrating hole of each of the plurality of electrode plates, so that one of the first electrode tab and the second electrode tab is electrically connected to each of the electrode plates.

5. The battery module as claimed in claim 1, wherein:
    a region of the first electrode plate passes between the pair of mounting protrusions, and
    the first electrode plate extends past the pair of mounting protrusions.

6. The battery module as claimed in claim 1, wherein the first electrode plate extends past the second electrode plate.

7. The battery module as claimed in claim 1, wherein:
    the connection members include a first connection member and a second connection member, and
    one of the connection members is mounted on the pair of mounting protrusions.

8. A battery module, comprising:
    a plurality of battery units each including a plurality of bare cells, each bare cell having a first electrode tab and a second electrode tab;
    a holder at one side of each of the battery units, the holder including a plurality of penetrating holes into each of which the first electrode tab and the second electrode tab are penetrated;
    a pair of mounting protrusions protruding from one side of the holder, the pair of mounting protrusions being spaced apart from each other;
    a plurality of electrode plates in the holder, the plurality of electrode plates electrically connecting the bare cells in each of the battery units;
    connection members coupled to ends of one of the plurality of electrode plates, the connection members electrically connecting the plurality of battery units to each other,
    wherein:
    the connection members include a first connection member and a second connection member, one of the connection members being mounted on the pair of mounting protrusions; and
    a portion of one of the plurality of electrode plates passes between the pair of mounting protrusions, wherein the connection member mounted on the pair of mounting protrusions is electrically insulated from the electrode plate having a region that passes between the pair of mounting protrusions.

9. The battery module as claimed in claim 8, further comprising fixing protrusions protruding from two sides of the mounting protrusions, one of the connection members being mounted on regions of the mounting protrusions between the fixing protrusions.

* * * * *